Dec. 28, 1965    R. M. WEYGANDT ETAL    3,225,530
APPARATUS FOR AND METHOD OF HARVESTING VINE-BORNE
FRUIT FROM WIRE SUPPORTS OR THE LIKE
Filed Aug. 9, 1963    2 Sheets-Sheet 2
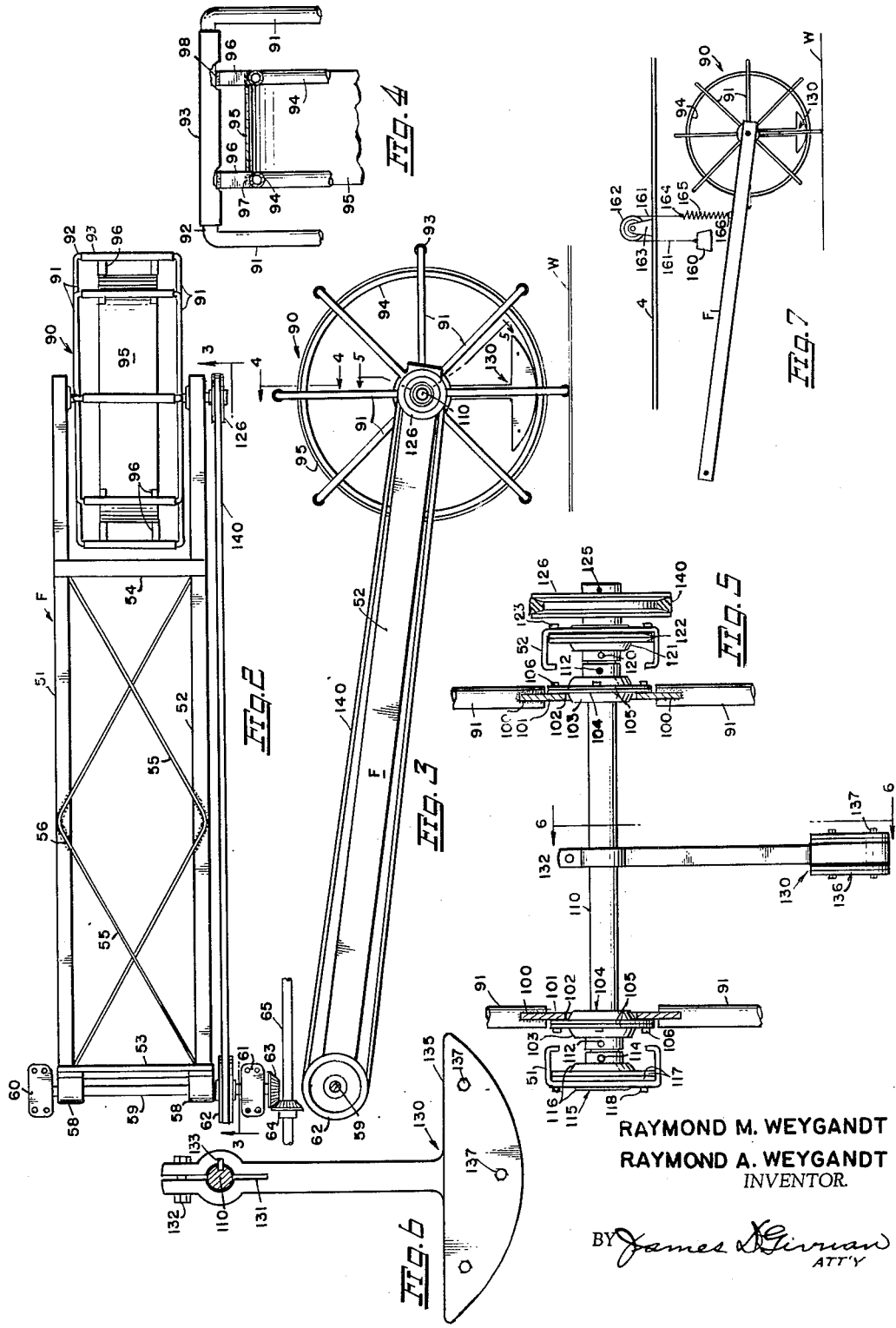
RAYMOND M. WEYGANDT
RAYMOND A. WEYGANDT
INVENTOR.

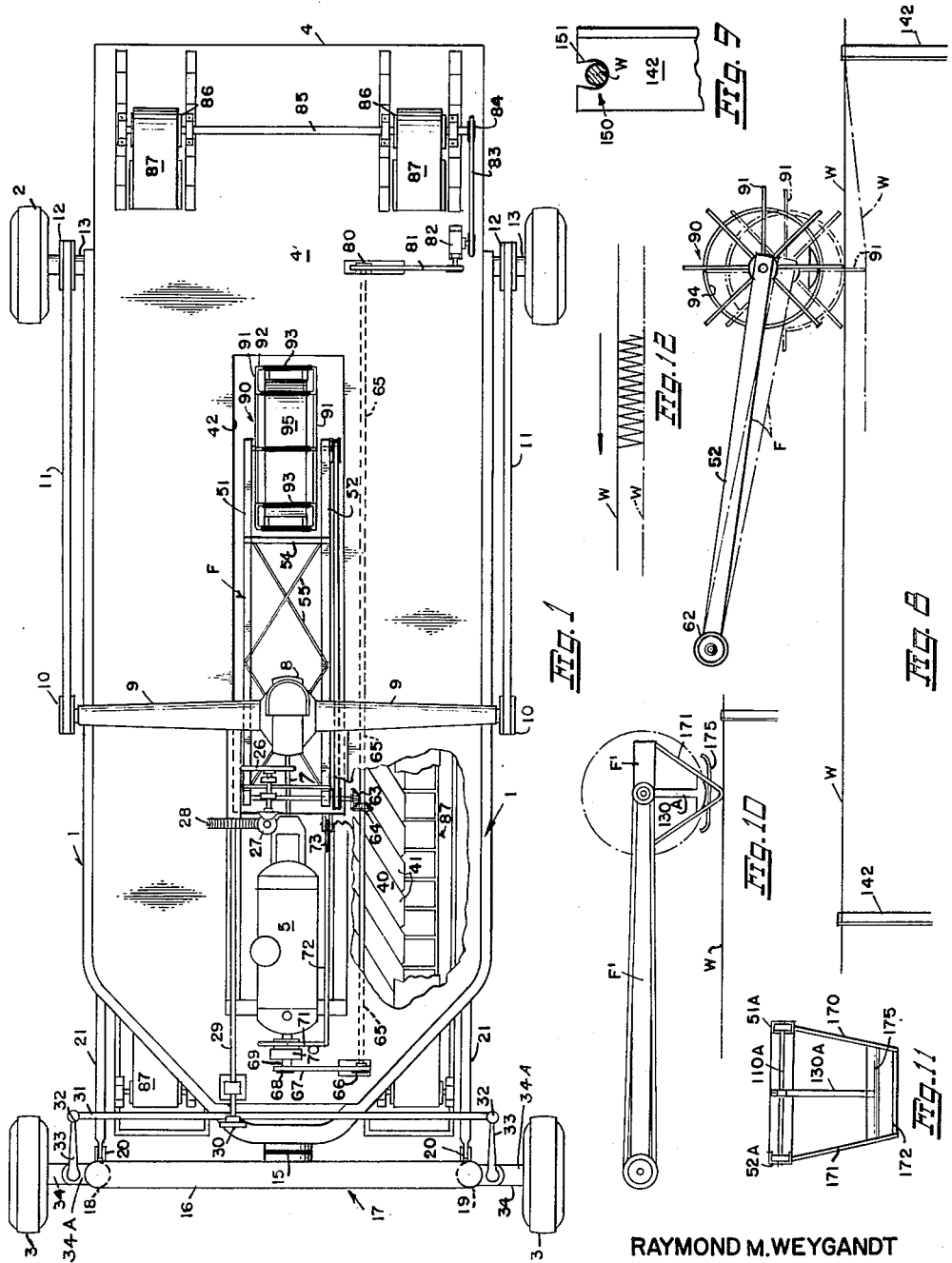

United States Patent Office 3,225,530
Patented Dec. 28, 1965

3,225,530
APPARATUS FOR AND METHOD OF HARVESTING VINE-BORNE FRUIT FROM WIRE SUPPORTS OR THE LIKE
Raymond M. Weygandt and Raymond A. Weygandt, both of Rte. 1, Box 308, Canby, Oreg.
Filed Aug. 9, 1963, Ser. No. 301,031
3 Claims. (Cl. 56—330)

This invention relates to improvements in apparatus for and a method of harvesting ripe vine-borne fruit such as berries, and the like from vines supported in row formation or entwined along post-supported wires or the like arranged in parallel rows.

Such fruit (for use in commercial processing operations) when in prime condition may be readily shaken from the fruit vines.

Accordingly it is the principal object of the present invention to provide simple, efficient, durable, inexpensive, and highly effective apparatus in the form of a row-straddling machine, self-propelled along the row and controlled by an operator as to duration and extent, and wherein the fruit harvesting instrumentality comprises either a rigid member or a wheel member and power driven means associated therewith for imparting shaking, vibratory or reciprocatory motion to the vines and/or wires for dislodging ripe fruit therefrom.

Associated with either of said harvesting instrumentalities is a power driven eccentric driven at a higher rate of r.p.m. than that imparted to the wheel by its rolling contact with the vine-supporting wire. The action of the eccentric imparts vibratory and vertical reciprocatory motion to the wheel which in turn transmits a translated shaking motion to the wire and hence to the fruit canes entwined therealong to effect complete removal of ripe fruit therefrom.

The foregoing and other objects and advantages which will become subsequently apparent reside in the details of construction and operation as more fully hereinafter described and claimed, reference being had to the accompanying drawings forming a part hereof and in which:

FIGURE 1 is a top plan view with parts broken away of a fruit harvesting machine suitable for achieving the objects and practicing the method of this invention.

FIGURE 2 is a top plan view on an enlarged scale of the fruit harvesting instrumentality removed from the machine shown in FIGURE 1.

FIGURE 3 is a side elevational view of FIGURE 2, partly in section along the line 3—3 of FIGURE 2.

FIGURE 4 is a fragmentary sectional view with parts broken away on an enlarged scale taken approximately along the line 4—4 of FIGURE 3.

FIGURE 5 is an enlarged fragmentary sectional and elevational view taken approximately along the line 5—5 of FIGURE 3.

FIGURE 6 is a sectional side elevational view taken approximately along the line 6—6 of FIGURE 5.

FIGURE 7 is a diagrammatic detail view of the harvesting instrumentality and means associated therewith for reducing or varying the load of the instrumentality upon the fruit supporting wire.

FIGURE 8 is a diagrammatic view illustrating the manner in which vibratory and vertical reciprocatory motion is imparted to the wire supporting the vine and hence to the vines themselves.

FIGURE 9 is a fragmentary elevational view on an enlarged scale of the top end portion of one of the typical posts shown in FIGURE 8 turned through 90 degrees.

FIGURE 10 is a view similar to FIGURE 8 illustrating a modified form of a fruit harvesting instrumentality.

FIGURE 11 is an elevational view on a slightly enlarged scale of the right hand end of FIGURE 10; and FIGURE 12 is a view similar to FIGURE 8 illustrating the manner in which vertical reciprocatory motion is imparted to the wire and the vine entwined therealong by the form of the invention illustrated in FIGURES 10 and 11.

With continuing reference to the drawings wherein like reference characters designate like parts, and particularly FIGURE 1 thereof, reference numeral 1 indicates generally the main frame of a harvesting machine supported upon traction wheels 2 and steerable idling front wheels 3.

A deck 4 is supported upon the main frame 1 of the machine and mounted thereon is an internal combustion engine 5 of suitable type and horsepower connected in the conventional manner by a drive shaft 7 to a differential within a housing 8 and to two driving axles (not shown) within axle housings 9. These axle housings are secured to the deck 4 by supporting brackets subjacent the housings as viewed in FIGURE 1 and hence not shown. The ends of the axles are provided with pulleys 10 connected by belts 11 to driven pulleys 12 secured to the outer ends of the axles 13 of the traction wheels 2. It will be readily understood that sprocket wheels could be substituted for the pulleys 10 and 12 and sprocket chains for the belts 11.

The forward end of the main frame is rockably attached by wear plates 15 to the top 16 of an inverted U-shaped front frame member indicated generally at 17 and the leg members 18 and 19 of this frame are connected as at 20 to the forward end of tie-rods 21 whose rearward ends are connected to two rear leg members or corner posts (not shown) of the main frame 1.

The rearward end of the main frame is fixedly secured to the top of an inverted U-shaped frame member not shown, and since the deck 4 is supported upon the top of these front and rear inverted U-shaped members a passageway extends entirely through the machine. The machine is steerable by any suitable mechanism such as a steering wheel 26, bevel gears 27, worm gears 28, steering column 29 connected by a link 30 to a tie-rod 31 which is connected as at 32 and 33 to axles 34 of the front wheels 3. The inner ends of the axles 34 are pivotally attached to lugs 34A extending outwardly from the bottom ends of the forward inverted U-shaped member 17 and hence steerable by the steering column and its linkage to the members 33 which interconnect the inner ends of the axles to the tie-rod 31.

The machine straddles a row of berry plants being dealt with and as the machine travels therealong the plants are received at the end of the flooring indicated generally at 40 made up of two series of overlapping plate-like shutter members indicated generally at 41 each pivotally mounted at its inner end and all normally disposed in herringbone fashion as shown along both sides of the longitudinal center line of the machine. The shutter members are spring-urged to the closed position shown and thus adapted to yieldingly open about the stalks of the plants as the machine travels along the row.

The deck 4 has an elongated rectangularly shaped opening 42 therein to accommodate the fruit dislodging or harvesting instrumentality of the invention, which, as best illustrated in FIGURES 2 and 3, includes a frame F comprising beams 51–52 preferably of channel section secured in parallel spaced relation to each other by an end plate 53 (see FIG. 2) and a cross plate 54 intermediate the ends of the beams. The beams are further reinforced by diagonal truss rods 55 welded to the flanges of the beams as at 56 and to the plates 53 and 54.

The forward or left hand end of the frame F is hingedly mounted relative to the underside of the deck 4, adjacent the corresponding end of the opening 42, by means of bearing blocks 58 through which is journaled a shaft 59 also journaled in bearing blocks 60 and 61 secured to the underside of the deck 4. A V-belt pulley 62 is secured to the shaft 59 to whose outer end is also secured a bevel gear 63 meshing at all times with a companion bevel gear 64 secured to a shaft 65 whose forward end is provided with a pulley 66 (see FIG. 1) driven by a belt 67 entrained thereover and over a pulley 68 on a power take-off shaft 69 from a clutching mechanism 70 driven by the engine 5 and controlled by a lever arm 71 attached to the forward end of a link 72 whose opposite end terminates in a hand lever 73. The opposite end of the shaft 65 is provided with a driven pulley 80 belt-coupled as at 81 to a speed reducer 82 connected by a belt 83 to a driven pulley 84 on one end of a shaft 85 to which pulleys 86 are secured for driving endless conveyor belts 87 entrained thereover. The bottom run of the belts partially underlie the shutter series 40 along both sides and throughout the length thereof, as shown fragmentarily in FIGURE 1.

The right hand or free end of the frame F of one embodiment of the fruit dislodging instrumentality, as best illustrated in FIGURES 2–5, is provided with a free-wheeling rotary member indicated generally at 90 comprising unitary spokes 91 generally U-shape in front elevation (see FIG. 4) to provide transverse or cross members 92 provided with a live rubber covering 93 which may be, for example, in the form of a split rubber hose adhered to the transverse members 92 in any suitable manner. Parallel ring members 94, entirely surrounded by an annular covering 95, are concentrically secured within the wheel 90 by hangers or spacers 96 secured by welding or the like as at 97 and 98 respectively to the ring members 94 and to the transverse members 92.

The inner ends of the spokes 91 (see FIG. 5) are split as at 100 for welded securement to hub-plates 101 each having a concentric central opening 102 therethrough to accommodate the outer race 103 of bearings indicated generally at 104. These outer races are made in two parts, each flanged as at 105 for bolted securement as at 106 to the hub plates 101. A shaft 110 is secured as at 112 to the inner race of each of said bearings 104. To the outer left hand end of the shaft 110 is secured as at 114 the inner race of a bearing 115 whose outer race 116 is made in two parts both flanged as at 117 and thereby secured within the frame channel member 51 by bolts 118.

To the opposite outer end of the shaft 110 is similarly secured as at 120 the inner race of a bearing 121 also flanged as at 122 and thereat secured by bolts 123 to the channel member 52. To the outermost end of the shaft 110 is secured, as at 125, a V-belt pulley 126.

An eccentric indicated generally at 130 is split at its top end portion as at 131 (FIG. 6) and thereat secured to the shaft 110 by means of a clamping bolt 132 and a key 133.

The bottom portion 135 of the eccentric is enlarged into the shape shown in side elevation in FIGURE 6 and matching plates 136 are removably secured to said bottom portion by bolts 137. Any desired number of these plates may be added to the bottom of the eccentric or selectively removed therefrom to vary the pendulous weight thereof.

The eccentric 130 being driven by the belt 140 is constrained to rotate in a circular path about its axis 110 and reacts against the constraint with a centrifugal force directed from the center of curvature of its path. This centrifugal force is equal and opposite to the centripetal force directed towards the center of curvature which is deviating the eccentric from a straight path. Both forces are equal to the product of the mass of the eccentric and its centripetal acceleration.

During such rotation of the eccentric the center of gravity of its weight alternately rises and falls. During the rise of the center of gravity its weight acts as a resistance, and energy is employed in lifting it to an amount expressed by the product of the weight into the vertical height of its rise, and during the fall of the center of gravity the weight acts as an effort, and exerts in assisting to perform the work of transmitting reciprocatory motion to the free end of the frame F, and its related parts in a vertical plane, an amount of energy exactly equal to that which had previously been employed in lifting it.

The vines from which fruit or berries are to be harvested are, as aforesaid, entwined along at least one wire W in each row secured to end posts, not shown, in any suitable manner, while the reach of the wire between the end posts rests within upwardly opening recesses (see FIG. 9) 150 in one flange of intermediate posts 142. Each recess has upwardly converging side edges 151, as shown, and the width of the open top end of the recess is substantially equal to the guage or diameter of the wire so as to require forced initial entry of the wire into the recess, after which while subjected to the vibratory or reciprocatory action of either form of fruit dislodging instrumentality the wire will be free to yield lengthwise to such action.

The modified form of fruit dislodging instrumentality illustrated in FIGURES 10 and 11 which under certain conditions or when dealing with other types of vine-borne fruit or berries, may advantageously replace the first form of such instrumentality indicated at 90, and comprises two inverted A-frames 170 and 171 of steel tubular form welded to the underside of the channel sections 51A–52A and interconnected at their bottom ends by a cross member 172 welded at its ends to the A-frames at the apices thereof. The eccentric 130A is secured at its top end to the power driven shaft 110A as in the other form of the invention.

A guard or pan 175 curved upwardly at both of its ends is secured in any suitable manner between the A-frames below the orbit of rotation of the eccentric 130A to function in the same manner as the annular covering 95 shown in the other form of the invention to protect fruit spurs or vines being dealt with against the whipping or beating action of the eccentric 130.

Although we have shown and described only one wire strung along the supporting posts it will be readily understood, two or three or any desired or necessary number of wires may be so supported without in any way diminishing the effectiveness of either form of fruit dislodging instrumentality.

For varying the weight imposed upon the wire W by the frame F and the wheel 90 we provide, as illustrated in FIGURE 7, a weight 160 removably attached to one end of a flexible cable 161 entrained over a sheave 162 journaled in a bracket 163 secured to the top surface of the deck 4. The opposite end of the cable is secured as at 164 to the top end of a tension spring 165 whose bottom end is secured as at 166 to the top of the frame F. This weight regulating assembly may obviously and in the same manner be incorporated in modification shown in FIGURE 10.

Assuming that the weight of the free end of the assembly is 75 pounds and it is found desirable to impose a weight of only 25 pounds upon the wire then the weight 160 would be 50 pounds. The weight of 160 may of course be varied to thus increase or decrease the load upon the wire W as desired or deemed necessary.

In operating the form of the invention illustrated in FIGURES 1–8 we obtain satisfactory results when the machine is traveling along the row of fruit vines at the rate of approximately three-fourths miles per hour with the power driven eccentric 130 rotating at a speed of not less than 200 revolutions per minute. The reciprocatory motion in a vertical plane generated by such rotation of the eccentric will impart an upward and downward stroke of approximately four inches to the free end of the frame F and the wheel 90 carried thereby as the wheel rolls along the wire or wires W.

This reciprocatory motion is transmitted to the wire or wires to effectively shake the ripened fruit from the vines entwined therealong.

The frequency of reciprocation, ranging from high to low, can of course be regulated by the speed or rotation of the eccentric.

Similarly vibratory reciprocal motion in a vertical plane, by rotation of the eccentric 130A in the modification shown in FIGURES 10–11, will be imparted to the wire W (FIG. 12) and hence to vines entwined therealong, by the progressive bouncing percussive action of the fruit dislodging instrumentality 170–172 in the direction of the applied arrow. The zigzag line between the full and broken line positions of the wire W merely indicate its up and down motion necessary to dislodge ripened fruit from the vines.

It will be readily apparent that the progressive steplike or intermittent spaced-apart percussions imparted to the wire W by the cross member 172 prevents any damage to the vines entwined along the wire which would otherwise occur if the cross member were dragged along the wire in a straight linear movement.

While we have shown particular forms of embodiment of our invention, we are aware that many minor changes therein will readily suggest themselves to others skilled in the art without departing from the spirit and scope of the invention. Having thus described our invention what we claim as new and desire to protect by Letters Patent is:

1. In a machine for harvesting fruit from vines supported in row formation comprising in combination,
   a rotatable vine-impinging means carried by the machine,
   means mounting said impinging means for intermittent impingement against said vines,
   means associated with and rotatable independently of said vine-impinging means for imparting reciprocatory motion to the vine-impinging means,
   a power source carried by the machine, and
   a driving connection between said power source and said independently rotatable means.

2. In a machine for harvesting ripe fruit from vines supported in row formation,
   the combination of a power source carried by the machine,
   a frame,
   means mounting the frame for movement in a vertical plane relative to said vine supporting means,
   a first pair of non-rotatable bearing members,
   a shaft journaled in said first pair of bearings,
   means operatively interconnecting said shaft with said power source,
   eccentric means secured to and rotatable with said shaft,
   a second pair of bearing members concentrically surrounding said shaft,
   a wheel member journaled on said second bearing members and freely rotatable about said shaft by rolling contact with said vines while imparting reciprocatory motion thereto to dislodge ripe fruit therefrom.

3. In a machine for harvesting ripe fruit from vines supported in row formation comprising in combination,
   vine-impinging means,
   elongated means swingably attached at one of its ends to said machine and mounting at its free end said impinging means for movement in a vertical plane,
   means for imparting reciprocatory motion in a vertical plane to said free end of said elongated means and said vine-impinging means to dislodge ripened fruit from said vines as the machine moves along a vine row,
   a variable counterweight, and
   means yieldingly connecting said counterweight to said elongated means near the free end thereof for varying the load imposed upon said vines by said vine-impinging means.

References Cited by the Examiner
UNITED STATES PATENTS

| | | | |
|---|---|---|---|
| 515,031 | 2/1894 | Turner | 56—29 |
| 1,278,175 | 9/1918 | Le Baron | 56—330 |
| 1,483,725 | 2/1924 | Harrison | 56—330 |
| 2,544,443 | 3/1951 | Brateng | 56—330 |
| 2,760,324 | 8/1956 | Stukenborg et al. | 56—11 |
| 2,993,323 | 7/1961 | Tubbs | 56—330 |

ABRAHAM G. STONE, *Primary Examiner.*

RUSSELL R. KINSEY, *Examiner.*